United States Patent [19]

Miwa

[11] Patent Number: 5,029,892
[45] Date of Patent: Jul. 9, 1991

[54] HYDRAULIC SUSPENSION CONTROL DEVICE

[75] Inventor: Katsuhiko Miwa, Aichi, Japan

[73] Assignee: Aisin Seiki Kabushiki Kaisha, Kariya, Japan

[21] Appl. No.: 502,987

[22] Filed: Apr. 2, 1990

[30] Foreign Application Priority Data

Mar. 31, 1989 [JP] Japan .................................. 1-83738
Mar. 31, 1989 [JP] Japan .................................. 1-83739

[51] Int. Cl.$^5$ .............................................. B60G 11/26
[52] U.S. Cl. ................................... 280/707; 280/689; 280/714
[58] Field of Search .................... 280/707, 714, 689

[56] References Cited

U.S. PATENT DOCUMENTS 4,730,843 3/1988 Tanaka et al. ...................... 280/689
4,801,155 1/1989 Fukushima et al. ................ 280/707

FOREIGN PATENT DOCUMENTS 0106697 4/1984 European Pat. Off. .
0246655 11/1987 European Pat. Off. .
WO8402886 8/1984 Int'l Pat. Institute .
60-209315 10/1985 Japan .
62-198511 9/1987 Japan .

Primary Examiner—Kenneth R. Rice
Attorney, Agent, or Firm—Burns, Doane, Swecker & Mathis

[57] ABSTRACT

A hydraulic suspension control device includes a real yaw-rate detector means for detecting angular velocity around a vertical axis of a vehicle body and a vehicle speed detector for detecting the vehicle speed and a wheel angular detector for detecting the front wheel angle and a target yaw-rate calculation for calculating the target yaw-rate using signal values from the vehicle speed detector and the wheel angle detector. The electric control device includes a driving circuit which is set to receive a signal of deviation between the real yaw-rate and the target yaw-rate and controls an actuator having a pressure valve and a hydraulic cylinder both of which are controlled by the electric control device so that an instability yawing in vehicle movement such as rear wheel side slips can be prevented during the vehicle turning movement.

7 Claims, 3 Drawing Sheets

HYDRAULIC SUSPENSION CONTROL DEVICE

BACKGROUND OF THE INVENTION

1. Field of the Invention

This invention relates to a hydraulic suspension control device for a vehicle, and more particularly to an improved hydraulic suspension control device in which instability yawing of vehicle movement is prevented during vehicle turning maneuvers.

2. Description of the Related Art

A prior hydraulic suspension control device is known from Japanese Laid-Open Print No. 62-198511. Therein, the hydraulic suspension control device provides for obtaining a quick and stable vehicle turning movement by means of an independently controlled rolling stiffness between front and rear wheels. Rolling stiffness is provided in such manner that the steering characteristic of the vehicle can be either over-steering or under-steering in accordance with vehicle behavior during the vehicle turning movement or maneuver.

However, the hydraulic suspension control device is controlled so as to change the steering characteristic of the vehicle into an over-steer characteristic in a first stage of the vehicle turning movement. Therefore, the vehicle rear wheels begin to slip which results in an extremely unstable vehicle behavior.

Another prior hydraulic suspension control device is known from Japanese Laid-Open Print No. 62-275814. Therein, the hydraulic suspension control device is provided to obtain a quick vehicle turning movement by changing into a positive over-steering characteristic according to lateral acceleration and driving force during the vehicle turning movement.

Also, as driving force transmitted to the driving wheels is reduced to zero during braking operation, control of spin or drift during turning movement of the vehicle by use of the brakes is not precisely performed. In addition, since road conditions have not been considered, if a setting of the control is made with the assumption of a relatively high $\mu$-road (high coefficient of friction), the vehicle is prone to movement into tail-slide conditions upon generation of high centrifugal force or high driving force. Accordingly, vehicles provided with the foregoing control cannot have an over-steer characteristic since centrifugal force or driving force should be low due to slipping of the vehicle on low $\mu$-road (low coefficient of friction).

SUMMARY OF THE PRESENT INVENTION

It is an object of the present invention to provide a hydraulic suspension control device in which instability yawing during vehicle movement, such as vehicle slipping or skidding, is prevented during turning movements of the vehicle.

It is another object of the present invention to provide a hydraulic suspension control device in which instability rolling during vehicle movement such as vehicle slipping or skidding is prevented during the turning movements of the vehicle.

BRIEF DESCRIPTION OF THE DRAWINGS

These and other objects, features and advantages of the present invention will become fully apparent on reading the following detailed description with reference to the accompanying drawings, wherein like members bear like reference numerals, and wherein.

DETAILED DESCRIPTION OF PREFERRED EMBODIMENTS OF THE INVENTION

Figure 1:
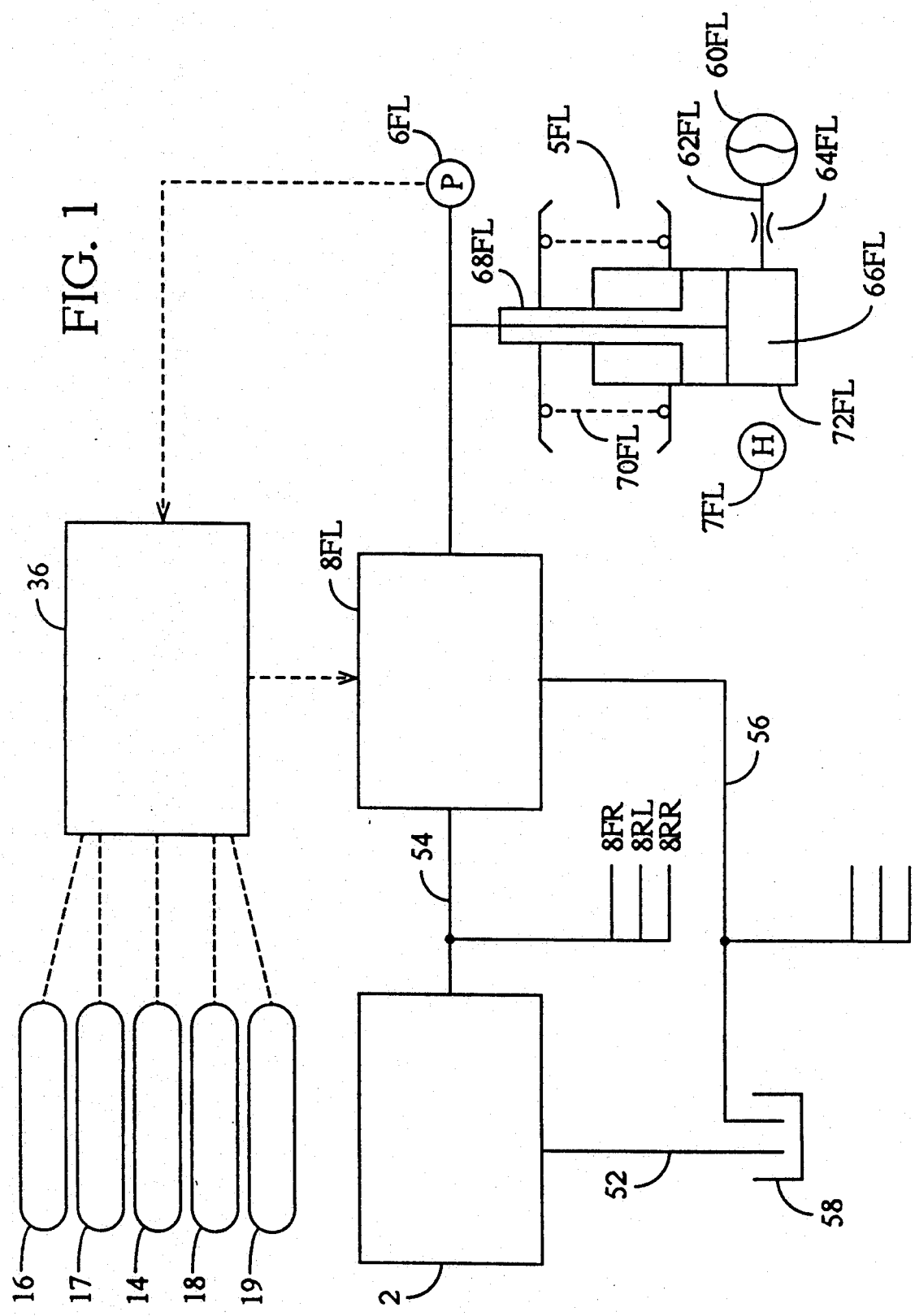
FIG. 1 is a schematic diagram of the major components of a preferred embodiment of the hydraulic suspension control device according to the present invention.

FIG. 1 is a schematic diagram showing major physical components of a preferred embodiment of the hydraulic suspension control device of the present invention. The hydraulic suspension control device is mainly composed of four pressure valves 8FL, 8FR, 8RL, 8RR, four pressure actuators 5FL, 5FR, 5RL, 5RR, an electric control device 36 and five sensors, 14, 16, 17, 18, 19. Since the control of each wheel is of the same construction, the front left wheel only will be detailed hereinafter.

In this device, a hydraulic cylinder 72FL of the actuator 5FL is connected to a member (not shown) at a side of the wheel and a piston rod 68FL is secured to a member (not shown) at a side of the vehicle body. Also, a coil-spring 70FL is interposed between the foregoing members so as to support the load of the vehicle body. Normally, vehicle height variations, due to the variation of load to the wheel, is a result of vibrations or turning movements and can be adjusted by controlling pressure in a working fluid chamber 66FL of the hydraulic cylinder 72FL. The working fluid chamber 66FL is in fluid communication with an accumulator 60FL via a line 62FL provided with a restriction 64FL for generating a damping force effect. In addition, the working fluid chamber 66FL is also in fluid communication with a pressure valve 8FL.

The pressure valve 8FL is connected to a pump 2 via a high pressure flow line 54 which is in fluid communication with the actuators 5FL, 5FR, 5RL, 5RR and is controlled by the electric control device 36 so as to supply or drain the working fluid into or from the working fluid chamber 66FL and is responsive to signals representative of the condition of the vehicle behavior or travel from the sensors 14, 16, 17, 18, 19. A signal representative of the pressure in the actuator 5FL is continually transmitted to the controller 36.

The pump 2 is in fluid communication, via a suction flow line 52, with reserve tank 58 containing therein working fluid which is in communication with a drain line 56 of the pressure valve 8FL. The pump 2 is operatively connected to an engine (not shown) so as to be driven thereby.

Figure 2:
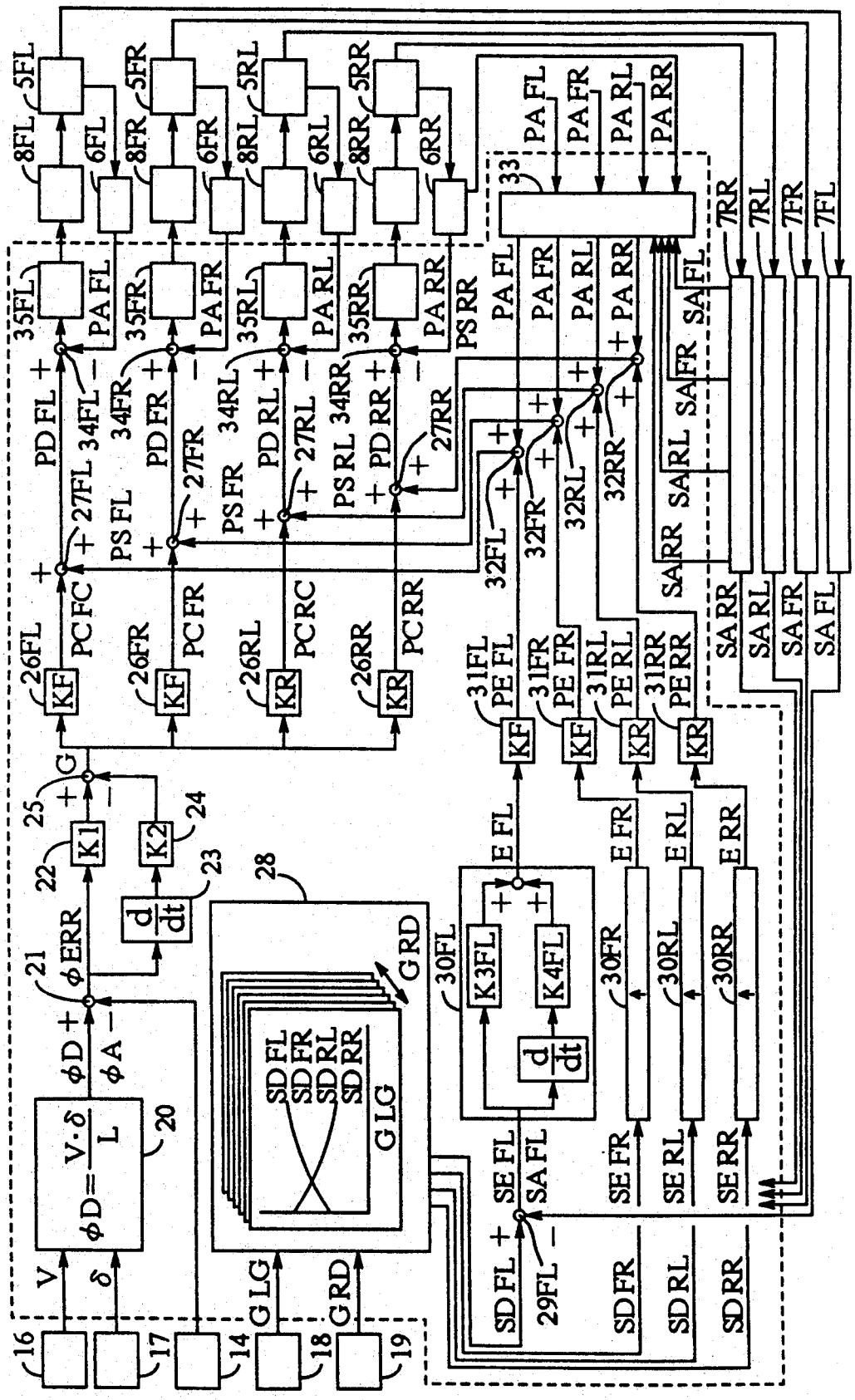
FIG. 2 is a block diagram showing an electric control system of a first preferred embodiment of the hydraulic suspension control device of the present invention.

FIG. 2 is a block diagram showing details of the electric controller 36. In FIG. 2, vehicle height sensors 7FL, 7FR, 7RL, 7RR, a longitudinal acceleration sensor 18, a lateral acceleration sensor 19, a vehicle speed sensor 16, a wheel angle sensor 17 and a yaw-rate sensor 14 (for detecting the vehicle turning movement which detects the angular speed about the vertical axis of the vehicle), provide various signals which are transmitted to the electric control device 36 and the signals are outputted therefrom to the pressure actuators 8FL, 8FR, 8RL, 8RR for the controls thereof.

A first step of the control is a calculation to clear any deviation between a target yaw-rate and a real yaw-rate. The real yaw-rate is detected by the yaw-rate sensor 14. The target yaw-rate is calculated by a register 20 by detecting the real vehicle speed detected by the vehicle sensor 16, a real front wheel angle detected by the wheel angle sensor 17 and a constant L (length of wheel base) into a formula shown in FIG. 2 and as set forth below. In detail, the signal detected by the wheel angle sensor 17 is the front wheel angle which is defined as an angle of revolution of the front wheel with respect to the longitudinal direction or axis of the vehicle body. Instead of the angle, a product of the revolution angle of steering and the gear ratio of a steering could be used. In addition, the counter-clockwise direction of the angle is determined to be a positive direction when the vehicle is viewed from above. In the register 20, the target yaw-rate is calculated by using the following formula:

$$\phi_D = V \cdot \delta / L$$

It should be noted that the foregoing formula is a theoretical expression based on the assumption that side forces of each wheel are proportional to the constructing force and the lateral slide angle, i.e., the cornering force and the slip angle during the turning movement of the vehicle, respectively.

Also, since the vehicle body is often set to have a slight under-steering characteristic, the following formula taking into account the coefficient of the understeer characteristic, $K_{us}$, can be used instead of the above-mentioned formula.

$$\phi_D = V \cdot \delta / (L + K_{us} \cdot V^2 / g)$$

where g is gravity.

Next, in a comparator 21, the deviation $\phi_{ERR}$ between the real yaw-rate is calculated and a calculation compensating PD control is formed a sign of a signal $\phi_A$ (the real yaw-rate) is set to be positive when the vehicle turns to the left.

The deviation $\phi_{ERR}$ and a differentiation thereof with respect to time t are multiplied by a predetermined gain K1 and K2 in amplifiers 22 and 24, respectively, and are added in an adder 25 and the resulting value or sum is outputted therefrom as a signal G. This signal G is applied to adders 27FL, 27FR, 27RL, 27RR as control signals PCFL, PCFR, PCRL, PCRR after being amplified in amplifiers 26FL, 26FR, 26RL, 26RR.

A second step of the control is performed so as to clear any deviation of the vehicle height between a target vehicle height and the real vehicle height. That is to say, a longitudinal acceleration and lateral acceleration are detected by the sensor 18 and the sensor 19 both of which are secured to the vehicle body in a well-known manner and are outputted therefrom as signals GLG and GRD. It should be noted that the sign of signal GLD is set to be positive (negative) upon application of acceleration to the vehicle body in a forward driving direction (rearward driving direction) thereof due to braking operation (stopping operation). A sign of signal GRD is set to be positive (negative) upon clockwise (counter-clockwise) turning movement of the vehicle. In addition, the vehicle height sensor 7 in the form of a potentiometer, for example, is interposed between the member at the side of vehicle body and the member at the side of wheels and operates in such a manner it outputs positive (negative) signal when the vehicle body is raised (lowered) from a set height or a neutral position.

When the longitudinal acceleration signal GLG or the lateral acceleration signal GRD is established, target heights SDFL, SDFR, SDRL, SDRR are selected after comparison with a table 28 in a memory of the electric device 36 based on the foregoing established signal and are outputted to the corresponding comparators 29. It should be noted that in the table various target vehicle heights are previously available in response to the longitudinal acceleration signal GLG and/or the lateral acceleration signal GRD for each.

Also, signals SAFL, SAFR, SARL, SARR are detected at the vehicle height sensors 7FL, 7FR, 7RL, 7RR and are transmitted to corresponding ones of the comparators 29 so as to be compared with the target vehicle heights SDFL, SDFR, SDRL, SDRR and the deviations SEFL, SEFR, SERL, SERR are calculated. Thereafter a proportional differential (PD) control is performed, for example, as to the front left wheel, the deviation SEFL is a controlled PD calculation for compensating in a transfer 30FL.

The deviation SEFL and a differentiation thereof with respect to time t are multiplied by a predetermined gain K3 and K4 in the common transfer 30, respectively. Both values are added in the transfer 30 and is outputted therefrom as a signal EFL. It is noted that K3 and K4 are same sign. The signal EFL is amplified in the amplifiers 31FL and resulting signal is outputted as a pressure control value PEFL, obtained from the vehicle height deviation, to an adder 32FL. With respect to remaining wheels, similar controls are performed. It should be noted that the gain K3 and the gain K4 are selected so that the deviation SEFL becomes zero during normal vehicle travel.

In a reference pressure memory 33, four standard or reference pressures are stored for supporting the vehicle body when the vehicle is stopped or is in straight movement at a constant speed. Signals PMFL, PMFR, PFRL, PFRR are outputted to amplifiers 32FL, 32FR, 32RL, 32RR so that the working fluid pressure in each of the hydraulic cylinders 72FL, 72FR, 72RL, 72RR may become a corresponding standard pressure. Therefore, the pressure control value PEFL and signal PMFL are added at the amplifier, 32FL and resulting value PSFL is outputted to an adder 27FL.

In the adder 27FL, the pressure control value PCFL and signal PSFL are added and resulting signal PDFL is outputted to a comparator 34FL.

In the comparator 34FL, a deviation is calculated between the signal PDFL and the signal PAFL which is the working fluid pressure in the cylinder 5FL fed back to the comparator 34FL as a signal from the pressure sensor 6FL. The resulting deviation is supplied to a driving circuit 35FL which controls the pressure valve 8FL. As to the remaining wheels, similar controls are performed.

Hereinafter, operation of the foregoing embodiment upon turning movement of the vehicle in the leftward direction will be described.

During regular turning movement of the vehicle, the real yaw-rate signal $\phi_A$ is substantially equal to the target yaw-rate $\phi_D$, thereby the deviation between and difference value thereof is zero. Therefore, the signal outputted from the adder 25 becomes zero. The pressure control value PC is also zero and the working fluid pressure of each cylinder is controlled by a feed back operation so as to equalize the real vehicle height to the target vehicle height.

Under such condition, application of strong braking operation causes the rear wheel side to slip outward against the front wheel side. As a result, the real yaw-rate signal $\phi_A$ (positive value) is not only increased, but the deviation $\phi_{ERR}$ ($=\phi_D-\phi_A$) is also increased and the deviation $\phi_{ERR}$ is outputted to the adder 27 through PD calculation for compensating. A sign of each signal $PC_{FL}$, $PC_{FR}$, $PC_{RL}$, $PC_{RR}$ becomes $PC_{FL}<0$, $PC_{FR}>0$, $PC_{RL}>0$, $PC_{RR}<0$. The signal $PD_{FR}$ is decreased, therefore the working fluid pressure in the hydraulic cylinder 72FL of the front-left wheel (not shown) is decreased by means of controlling the pressure valve 8FL through a driving circuit 35. Accordingly, the height of the front-left wheel is decreased. In the same way, the height of the front-right wheel is increased, the height of the rear-left wheel is increased, the height of the front-right wheel is decreased. Accordingly, the steering characteristic of the vehicle turning movement becomes an under-steer characteristic instead of an over-steer characteristic and the rear wheel side is prevented from slipping against the front wheel side. Next, the sign of the difference value of the deviation assumes an opposite sign in the PD calculation for compensating when the deviation begins to decrease. Therefore, the steering characteristic of the vehicle turning movement or maneuver is changed away from an under-steering characteristic by decrease of the output signal G and vehicle turning movement is in a stabilized condition.

During vehicle movement in a straightforward direction, when the operator turns the steering wheel of the vehicle to the left, the start of the turning movement of the vehicle is delayed with respect to the timing of the operator's motion. The deviation signal $\phi_{ERR}$ ($=\phi_D-\phi_A$) is increased in the positive direction and the signal G is outputted from the adder 25 with a positive sign. Accordingly, the steering characteristic of the vehicle turning movement changes back to the over-steer characteristic.

In such manner, the steering characteristic of the vehicle turning movement changes dependent on the load movement between the front wheel side and the rear wheel side.

Figure 3:
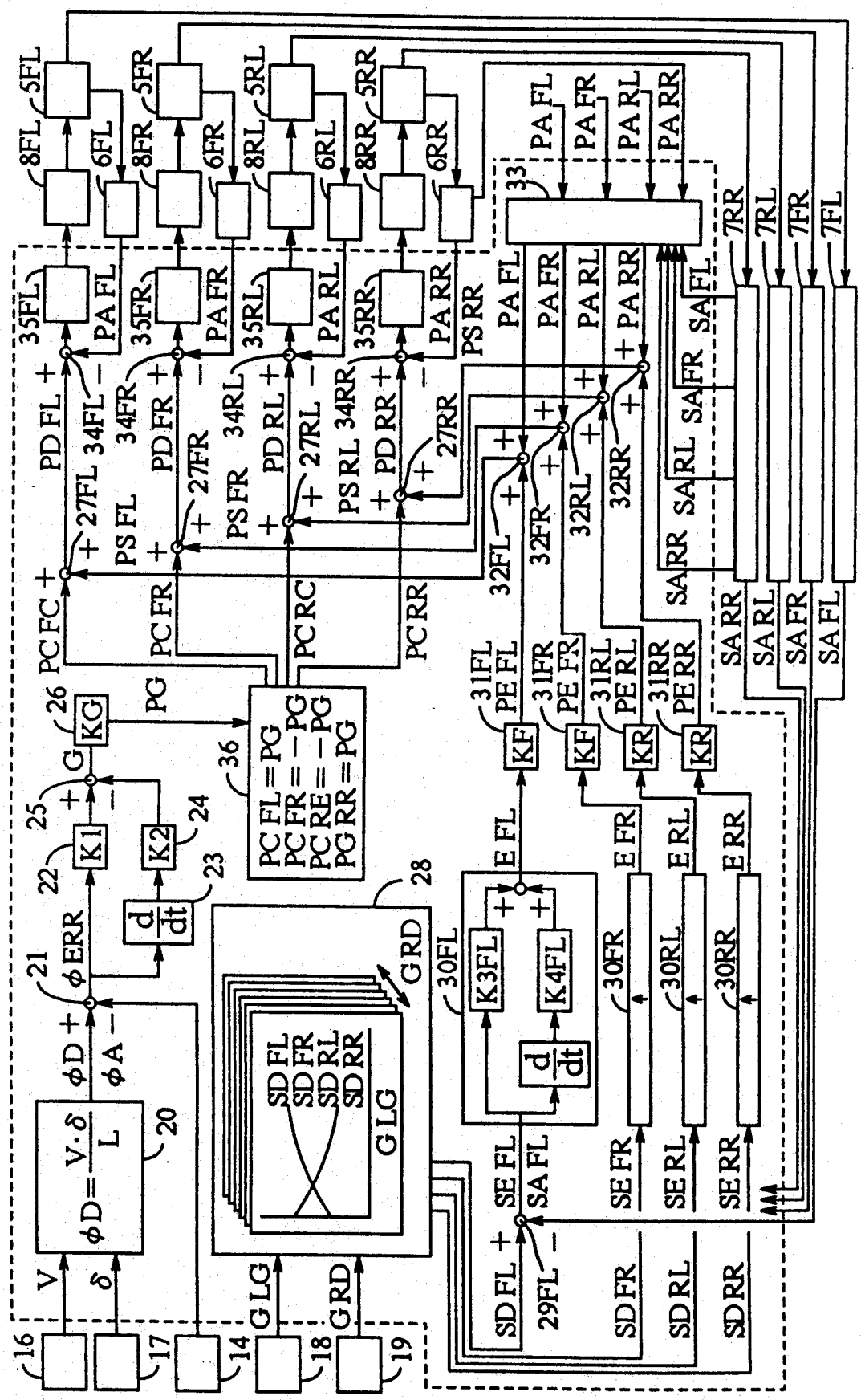
FIG. 3 is a block diagram showing an electric control system of a second preferred embodiment of the hydraulic suspension control device of the present invention.

In FIG. 3, only the differences between the first embodiment and the second will be described. Therein, comparator 36 is interposed between the amplifier 26 and each of the adders 27FL, 27FR, 27RL, 27RR. The comparator 36 is set to be output the same control value of signals PCFL, PCFR, PCRL, PCRR to each of the adders 27FL, 27FR, 27RL, 27RR. As a result, the difference of the load movement of the vehicle between the left wheel of the vehicle and the right wheel thereof is zero, and rolling and/or pitching of the vehicle turning movement is prevented during the turning movement.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A hydraulic suspension control device comprising:
   a real yaw-rate detecting means for detecting an angular velocity with respect to a vertical axis of a vehicle body;
   a vehicle speed detecting means for detecting vehicle speed;
   a wheel angular detecting means for detecting front wheel angle;
   a target yaw-rate calculating means for calculating a target yaw-rate by comparing signal values from said vehicle speed detecting means and said wheel angular detecting means;
   control means for controlling a deviation between the real yaw-rate and the target yaw-rate so that the deviation between the real yaw-rate and the target yaw-rate is zero; and
   an actuator including a pressure valve and a hydraulic cylinder which are controlled to adjust the suspension system in accordance with a signal from said control means.

2. A hydraulic suspension control device according to claim 1, herein said wheel angular detecting means for detecting change of the front wheel angle is responsive to steering wheel angle.

3. A hydraulic suspension control device according to claim 1, wherein said control means includes an adder which outputs a signal of deviation between a real vehicle height and a target vehicle height to a driving circuit.

4. A hydraulic suspension control device according to claim 3, wherein the target vehicle height value is determined in comparison with a target vehicle height map interrelating longitudinal acceleration and lateral acceleration of the vehicle.

5. A hydraulic suspension control device according to claim 1, wherein the actuator changes the vehicle height by supplying and discharging fluid pressure in the hydraulic cylinder via the pressure valve.

6. A hydraulic suspension system control device comprising:
   a real yaw-rate detecting means for detecting an angular velocity with respect to a vertical axis of a vehicle body;
   a vehicle speed detecting means for detecting vehicle speed;
   a wheel angular detecting means for detecting front wheel angle;
   a target yaw-rate calculating means for calculating a target yaw-rate by comparing signal values from said vehicle speed detecting means and said wheel angular detecting means;
   an electric controller including four driving circuits each of which receives each signal of deviation between said real yaw-rate and said target yaw-rate and a comparator which outputs the same control value signal to each of said driving circuits based on each of said signals of deviation; and
   an actuator including a pressure valve and a hydraulic cylinder which are controlled by said controller so as to adjust the suspension system.

7. A hydraulic suspension system control device comprising:
   a real yaw-rate detecting means for detecting an angular velocity with respect to a vertical axis of a vehicle body;

a vehicle speed detecting means for detecting vehicle speed;

a wheel angular detecting means for detecting front wheel angle;

a target yaw-rate calculating means for calculating a target yaw-rate by comparing signal values from said vehicle speed detecting means and said wheel angular detecting means;

control means for controlling a deviation between the real yaw-rate and the target yaw-rate so that the deviation between the real yaw-rate and the target yaw-rate is substantially zero, said control means including four driving circuits each of which receives each signal of deviation between said real yaw-rate and said target yaw-rate and a comparator which outputs the same control value signal to each of said driving circuits based on each of said signals of deviation; and an actuator including a pressure valve and a hydraulic cylinder which are controlled to adjust the suspension system in accordance with a signal from said control means.

* * * * *